United States Patent Office 3,577,419
Patented May 4, 1971

3,577,419
2,6-DISUBSTITUTED-4-(ω-AMINOALKOXY)
PHENYL PYRIMIDINES
Rudolf G. Griot, Riehen, Switzerland, assignor to
Sandoz-Wander, Inc., Hanover, N.J.
No Drawing. Continuation-in-part of application Ser. No.
725,197, Apr. 29, 1968. This application Oct. 24, 1969,
Ser. No. 869,330
Int. Cl. C07d 51/36
U.S. Cl. 260—256.4                                    12 Claims

ABSTRACT OF THE DISCLOSURE

This invention relates to 2-substituted-6-cyclosubstituted-4-[4-(ω-aminoalkoxy)phenyl]pyrimidines useful as hypolipidemics and/or as anti-convulsants, and to preparation of said compounds.

This invention relates to substituted 4-[4-(ω-aminoalkoxy)phenyl]pyrimidines, and to method of preparation of said compounds.

This application is a continuation-in-part of my copending prior application Ser. No. 725,197, filed Apr. 29, 1968, now abandoned.

More particularly, the compounds of the present invention are represented by the formula:

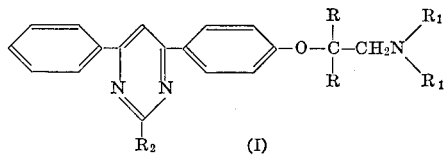

wherein:

each of R is, independently, hydrogen or lower alkyl, i.e., of no more than 4 carbon atoms,
each of $R_1$ is, independently, lower alkyl or taken together an alkylene bridge of 4 or 5 carbon atoms, i.e., N-pyrrolidyl or N-piperidyl, and
$R_2$ is amino, mono(lower)alkylamino of 1 to 4 carbon atoms, di(lower)alkylamino in which each lower alkyl group is of 1 to 4 carbon atoms or phenyl, and pharmaceutically acceptable acid addition salts thereof.

The compounds I of the present invention are preferably produced by reaction of an ω-aminoalkoxy derivative of chalcone with either a guanidine or benzamidine in presence of a suitable base, as illustrated below:

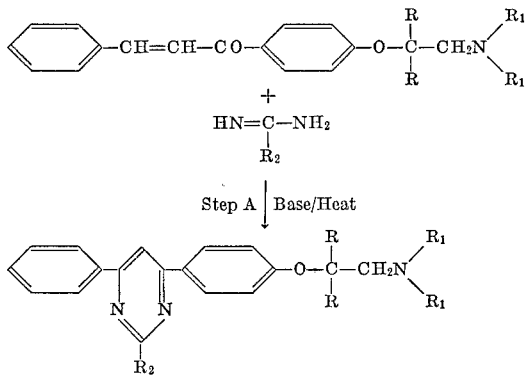

wherein R, $R_1$ and $R_2$ are as above defined.

The production of compound I by Step A involving reaction of compound II with compound III is carried out in the presence of a base and inert organic solvent at elevated temperatures, typically at temperatures between 40° C. to 130° C., most conveniently at reflux temperatures. The base employed has a stabilizing and catalytic influence on the reaction mixture and is desirably a mild base which is preferably an alkali metal alkoxide, more preferably a tertiary alkoxide such as potassium-tert-butoxide. Any suitable organic solvent may be employed including by way of example toluene and the alcohols, preferably a tertiary alcohol. In the more preferred and convenient forms of practice the solvent is readily selected as that alkanol which corresponds to the alkoxide employed, e.g., tert-butanol in the case of a tert-butoxide. Compounds I are conveniently recovered in the form of an acid addition salt, preferably the hydrochloride, and, if desired, may be converted to the free base by conventional procedures.

Compounds III are guanidines when $R_2$ is an amino group and because of their well-known properties as highly active bases are preferably employed in the form of an acid salt, more preferably the well-known and available forms such as carbonate, sulfate and the like, e.g., guanidine carbonate. Compound III is benzamidine when $R_2$ is phenyl, and is usually employed in such free base form in the reaction of Step A. The compounds of Formula III in general are known or may be prepared from known materials by established procedures.

Compound II may be prepared starting out from well-known materials as illustrated below as follows:

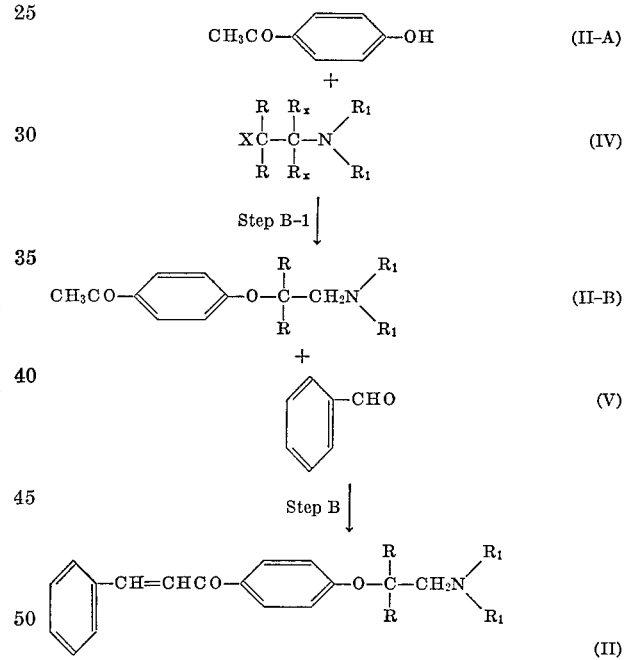

wherein R and $R_1$ have the above-defined meaning, X is halogen of atomic weight of from 35 to 127 and each of $R_x$ is hydrogen or lower alkyl but when both lower alkyl then both R's are hydrogen.

The compound II–B which is p-[β-(diethylamino)-ethoxy]acetophenone is known and can be prepared by Step B–1 involving reaction of compound II–A which is the known and available p-hydroxyacetophenone with compound IV which is the alpha halo derivative of or forming the desired omega aminoalkoxy moiety. Compounds IV in which $R_x$ is lower alkyl, i.e., the lower alkyl substituent is on the omega carbon atom, are capable of undergoing rearrangement on reaction with compounds of the compound II–A type to form compounds II–B in which the alpha carbon substituent R is lower alkyl, as described by J. F. Kerwin et al., J.A.C.S. 69, 2961 (1947). Such other of compounds II–B which are not known can be prepared from available materials by the known reaction of Step B–1, as described in British Pat. 377,464 and in Chemical Abstracts, 1933, 4031.

The production of compound II by reaction of compound II–B and benzaldehyde (compound V) in Step B involves a condensation of the known Claisen reaction type, analogous, for example, to typical procedures for preparation of well-known compounds such as chalcone. The reaction of Step B is carried out in the presence of a base preferably at temperatures between 0° C. to 40° C., more preferably 15° C. to 25° C., and in an inert organic solvent for reactants and product. Illustrative of suitable bases are the alkali metal hydroxides, preferably sodium hydroxide. The preferred solvents are the alcohols such as ethanol. The product compound II is usually recovered in the form of the acid addition salt, preferably the hydrochloride, and may be converted to the free base by conventional procedures.

Also within the scope of the present invention are pharmaceutically acceptable salts not materially affecting the pharmacological effect of the compounds of Formula I. Such salts include the acid addition salts, e.g., the hydrochloride, fumarate, formate, acetate, citrate, sulfonate, malonate, tartrate, methane sulfonate, salicylate and hydrosulfate. The acid addition salts may be produced as desired from the corresponding free bases by conventional procedures. Conversely, the free bases may be obtained from the salts by procedures known in the art.

The compounds of structural Formula I and their pharmaceutically acceptable acid addition salts are useful because they possess pharmacological activity in animals. In particular, the compounds are useful as hypolipidemic agents, as evidenced, for example, by having hypocholesteremic with or without hypotriglyceridemic activity, as indicated by tests on a group of white rats which are given 10–50 milligrams per kilogram of body weight per diem of the compound orally, for 6 days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H. B., Anal. Biochem. 9:393 (1964): (Technicon method N 24a): and Kessler, G., and Lederer, H. Technicon Symposium, Mediad Inc., New York, pages 345–347, (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about 0.5 gram of the compound, and the dosage forms suitable for internal use comprise from about 12 milligrams to about 250 milligrams of active compound in intimate admixture with a solid or liquid pharmaceutically acceptable carrier or diluent.

The compounds of Formula I in which $R_2$ is an amino moiety, i.e. either an unsubstituted or substituted amino group, are also useful as anticonvulsants as indicated by inhibition of chemically induced seizures using a minor modification of the method of Orloff et al., Proc. Soc. Exp. Biol., 70:254, 1949, both with mice on interperitoneal administration and in the rat on subcutaneous administration, by inhibition of maximal electroshock induced convulsion in mice according to the method of Toman et al., J. Neurophysiol 9:231 (1946) on interperitoneal administration, and by reducing convulsions elicited by electrical stimulation of the brain in cats. The particular dosage for use as anti-convulsant will vary depending upon the usual factors such as the particular compound employed and mode of administraton. However, in general, satisfactory results may be obtained when administered at a daily dosage of from 1 to 50 milligrams per kilogram of body weight. For most mammals the administration of from 50 to 1000 milligrams of the compound per day provides satisfactory results and dosage forms for internal administration comprise from about 12 to 500 milligrams of the compound in an inert carrier or diluent adapted for oral or parenteral administration in a conventional manner.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained acttion over a longer period. Similarly, suspensions, syrups and elixirs may contain the active ingredient in admixture with any of the conventional excipients utilized for the preparation of such compositions, e.g., suspending agents (methycellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients.

| Ingredients: | Weight (mg.) |
|---|---|
| 4 - [4 -(2 - diethylaminoethoxy) - phenyl]-2, 6 - diphenylpyrimidine hydrochloride | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

4'-(2-diethylaminoethoxy)chalcone hydrochloride

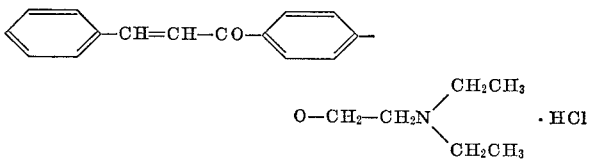

A solution of 47 g. of p - [β - (diethylamino)ethoxy] acetophenone, a known compound prepared according to British Pat. 377,464, and 20 g. of benzaldehyde dissolved in 100 ml. of ethanol is prepared and there is added thereto 80 ml. 2 N sodium hydroxide with intensive stirring at room temperature. The resulting mixture is stirred for 24 hours at room temperature and evaporated in vacuo to remove solvent. The residue is taken up in 200 ml. water and the resulting basic mixture is treated by extraction with ethyl acetate, the organic phase evaporated in vacuo to dryness, and the residue recrystallized twice from ethanol to give 4'-(2-diethylaminoethoxy)chalcone hydrochloride, M.P. 167–168.5° C.

EXAMPLE 2

2-amino-4-[4-(2-diethylaminoethoxy)-phenyl]-6-phenylpyrimidine dihydrochloride

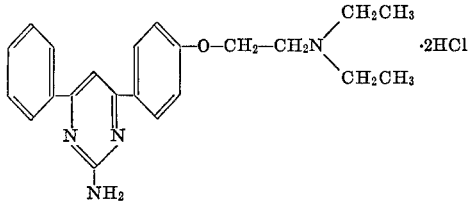

To a mixture of 6.4 g. of 4'-(2-diethylaminoethoxy) chalcone obtained from the product of Example 1 and 3.6 g. finely powdered guanidine carbonate, there is added 50 ml. of a 15% solution of potassium-t-butoxide in t-butanol. The resulting mixture was refluxed for 2 hours, evaporated in vacuo to remove solvent, and extracted with diethyl ether. The organic phase is evaporated in vacuo to obtain about 6.5 g. of crude base which is neutralized with diethyl ether containing hydrogen chloride. The resulting mixture is filtered and the solid residue crystallized twice from isopropanol/methanol (1:1) to obtain 2-amino-4-[4-(2 - diethylaminoethoxy)-phenyl]-6-phenylpyrimidine dihydrochloride, M.P. 200–203° C.

EXAMPLE 3

4-[4-(2-diethylaminoethoxy)-phenyl]-2,6-diphenylpyrimidine hydrochloride

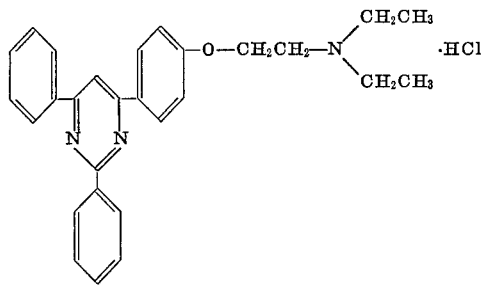

Proceeding as in Example 2, above, and employing equivalent amounts with benzamidine replacing guanidine carbonate, there is recovered after the recrystallization from isopropanol/methanol crystals of 4-[4-(2-diethylaminoethoxy)-phenyl]-2,6-diphenylpyrimidine hydrochloride, M.P. 204–205.5° C.

EXAMPLE 3

2-methylamino-4-[4-(2-diethylaminoethoxy)-phenyl]-6-phenylpyrimidine dihydrochloride

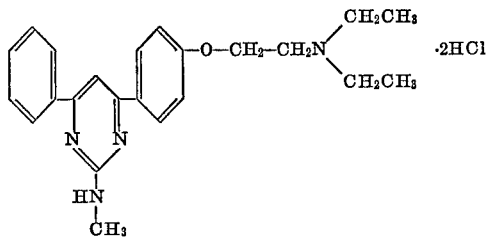

To a mixture of 48.0 g. of 4'-(2-diethylaminoethoxy) chalcone obtained from the product of Example 1 and 27.0 g. finely powdered methyl guanidine sulfate, there is added 375 ml. of a 15% solution of potassium-t-butoxide in t-butanol. The resulting mixture was refluxed for 4 hours and evaporated in vacuo to remove solvent to obtain an oil which is mixed with 500 ml. of $H_2O$. This mixture is extracted 3 times with diethyl ether. The organic phase is washed with saturated sodium chloride solution, dried and evaporated in vacuo to obtain a crude oil which is dissolved in diethyl ether containing hydrogen chloride. The resulting mixture is filtered, the solid residue washed with diethyl ether and crystallized from isopropanol containing minor portions of methanol and ethanol to obtain 2-methylamino-4-[4-(2-diethylaminoethoxy)-phenyl]-6-phenylpyrimidine dihydrochloride, M.P. 110–118° C.

EXAMPLE 4

2-dimethylamino-4-[4-(2-diethylaminoethoxy)-phenyl]-6-phenylpyrimidine dihydrochloride

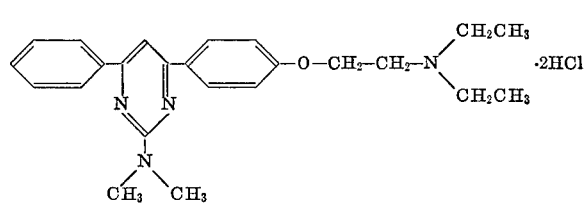

Following the procedure of Example 3, above, there is obtained on the crystallization from isopropanol/methanol/ethanol the compound 2-dimethylamino-4-[4-(2-diethylaminoethoxy)-phenyl]-6-phenylpyrimidine dihydrochloride, M.P. 178–181° C. Additional quantities of this product are obtained from the diethyl ether wash liquor.

What is claimed is:

1. A compound of the formula:

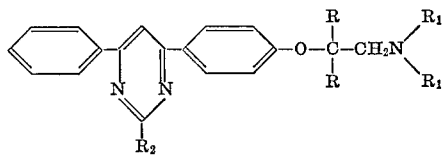

wherein each of R is independently hydrogen or lower alkyl,
each of $R_1$ is independently lower alkyl or taken together with the nitrogen to which they are attached are pyrrolidino or piperidino, and
$R_2$ is amino, mono(lower)alkylamino, di(lower)alkylamino or phenyl, or a pharmaceutically acceptable acid addition salt thereof.

2. A compound of claim 1 in which each R is hydrogen and each $R_1$ is lower alkyl.
3. The compound of claim 2 which is 2-amino-4-[4-(2-diethylaminoethoxy)-phenyl]-6-phenylpyrimidine.
4. The compound of claim 2 which is 4-[4-(2-diethylaminoethoxy)-phenyl]-2,6-diphenylpyrimidine.
5. A compound of claim 1 in which $R_2$ is from the group of amino, monoalkylamino and dialkylamino.
6. A compound of claim 5 in which $R_2$ is amino.
7. A compound of claim 5 in which $R_2$ is monoalkylamino.
8. A compound of claim 7 in which each R is hydrogen and each $R_1$ is lower alkyl.
9. The compound of claim 8 which is 2-methylamino-4-[4-(diethylaminoethoxy)phenyl-6-phenylpyrimidine.
10. A compound of claim 5 in which $R_2$ is dialkylamino.
11. A compound of claim 10 in which each R is hydrogen and each $R_1$ is lower alkyl.
12. The compound of claim 11 which is 2-dimethylamino-4-[4 - (diethylaminoethoxy)-phenyl]-6-phenylpyrimidine.

References Cited

Brown, The Pyrimidines, Interscience, 1962, pp. 102–3.

ALEX MAZEL, Primary Examiner

R. J. GALLAGHER, Assistant Examiner

U.S. Cl. X.R.

260—240, 570; 424—251